United States Patent Office 3,096,358
Patented July 2, 1963

---

3,096,358
SULFONATED 9,9-DI(CARBOXYALKYL) FLUO-
RENE AND ESTERS AND SALTS THEREOF
Christian F. Horn, South Charleston, W. Va., assignor to
Union Carbide Corporation, a corporation of New York
No Drawing. Filed Mar. 20, 1961, Ser. No. 96,683
10 Claims. (Cl. 260—429.7)

This invention relates to novel fluorene compounds. More particularly it is concerned with the monosulfo- and disulfo-9,9-di-(carboxyalkyl)-fluorenes, their monovalent metal sulfonate salts, their acyloxymetallo sulfonate salts, and the esters thereof.

The novel compounds of this invention can be represented by the generic formula:

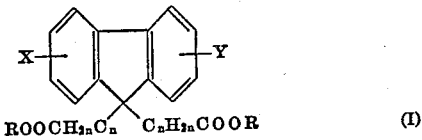

wherein X represents an X' or X" group; Y represents a Y' or —SO$_3$M'Z group; and X', X", Y', M', Z, R, and $n$ have the meanings hereinafter defined. Compounds encompassed are (II) the monosulfo-9,9-di-(carboxyalkyl)-fluorenes, the disulfo-9,9-di-(carboxyalkyl)-fluorenes, including their monovalent metal salts, ammonium salts, and esters thereof; and (III) the mono-(acyloxymetallosulfo)-9,9-di-(carboxyalkyl)-fluorenes, the di-(acyloxymetallosulfo)-9,9-di-(carboxyalkyl)-fluorenes, and esters thereof.

The monosulfo-9,9-di-(carboxyalkyl)-fluorene and disulfo-9,9-di-(carboxyalkyl)-fluorene compounds of this invention can be represented by the following sub-generic formula:

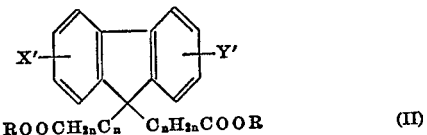

wherein X' represents a hydrogen atom or a Y' radical; Y' represents an —SO$_3$H radical, or an —SO$_3$M radical; M represents a monovalent group I metal atom, for example, lithium, sodium, potassium, rubidium, or cesium, or an —NR'$_4$ group; R' represents a hydrogen atom, or a monovalent hydrocarbyl radical, such as, an alkyl group containing from 1 to about 10 carbon atoms, for example, methyl, ethyl, propyl, isopropyl, butyl, pentyl, hexyl, 2-ethylbutyl, heptyl, octyl, decyl, and the like, or an aryl radical, for example, phenyl, naphthyl, and the like, or an aralkyl radical, for example, benzyl, phenethyl, and the like, or an alkaryl radical, for example, tolyl, xylyl, and the like; R represents a hydrogen atom, or an alkyl radical containing from 1 to about 10 carbon atoms; and $n$ is an integer having a value of from 1 to about 10, preferably from 2 to about 6.

Thus the monosulfo-9,9-di-(carboxyalkyl)-fluorenes of this invention are represented by the formula:

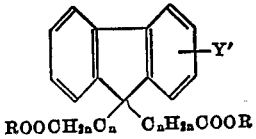 (IIA)

and the disulfo-9,9-di-(carboxyalkyl)-fluorenes are represented by the formula:

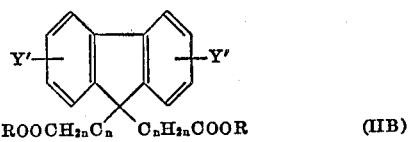 (IIB)

The 9,9-di-(carboxyalkyl)-fluorenes, which are used as starting materials for producing the monosulfo-9,9-di-(carboxyalkyl) - fluorene and disulfo-9,9-di-(carboxyalkyl)-fluorene derivatives, are members of a class of known compounds. The sulfonated fluorene compounds falling within the scope of Formulae IIA and IIB are produced by known sulfonation procedures. Thus, for example, the 9,9-di-(carboxyalkyl)-fluorenes represented by the general formula:

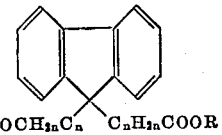

can be sulfonated with concentrated sulfuric acid. At temperatures up to about 65° C. monosulfonation predominates, and yields of 80 percent or better of the monosulfonic acid derivative are obtained. At temperatures above 65° C., and preferably from about 90° C. to about 130° C., disulfonation is the predominating reaction. In both instances, however, small yields of the other sulfonic acid derivatives are also produced; and varying the temperature employed results in varying the ratio of monosulfo and disulfo compounds formed.

The ratio of sulfuric acid to 9,9-di-(carboxyalkyl)-fluorene can vary over the range of from about 1:1 to about 10:1. Lower ratios favor the formation of monosulfo-9,9-di-(carboxyalkyl)-fluorene, and a ratio of about 2:1 is preferred for high yields of this compound in the sulfonation reaction. Higher ratios favor the formation of disulfo-9,9-di-(carboxyalkyl)-fluorene, and a ratio of about 4:1 is preferred for high yields of this latter compound in the sulfonation reaction. Advantageously, a sulfonation catalyst, such as mercury, mercuric sulfate, vanadium pentoxide, and the like, can be used, but its presence is not essential.

When the 9,9-di-(carboxyalkyl)-fluorene used as starting material is the free acid, that is when R is hydrogen, the sulfonated fluorene compounds can readily be converted to the esters, where R is an alkyl radical, by conventional esterification procedures known to those skilled in the art.

The monosulfo-9,9-di-(carboxyalkyl)-fluorene and disulfo-9,9-(dicarboxyalkyl)-fluorene compounds are readily converted to the metal or ammonium salts by reaction with salts or hydroxides of the monovalent cationic component represented by M.

Illustrative of the monosulfo-9,9-di-(carboxyalkyl)-fluorenes and disulfo-9,9-di-(carboxyalkyl)-fluorenes contemplated by this invention one can mention:

9,9-di-(2'-carboxyethyl)-fluorene-2-sulfonic acid,
9,9-di-(3'-carboxypropyl)-fluorene-2-sulfonic acid,
9-(2'-carboxyethyl)-9-(3' - carboxypropyl)-fluorene-2-sulfonic acid,
9,9-di-(4'-carboxybutyl)-fluorene-2-sulfonic acid, 9-(2'-carboxyethyl)-9-(4-carboxybutyl)-fluorene - 2 - sulfonic acid,
9,9-di-(5'-carboxypentyl)-fluorene-2-sulfonic acid,
9-(2'-carboxyethyl)-9-(5' - carboxypentyl)-fluorene-2-sulfonic acid,
9-(2'-carboxyethyl)-9-(6' - carboxyhexyl)-fluorene-2-sulfonic acid,
9-(2'-carboxyethyl)-9-(7' - carboxyheptyl)-fluorene-2-sulfonic acid,
9-(2'-carboxyethyl)-9-(8' - carboxyoctyl)-fluorene-2-sulfonic acid,
9-(2'-carboxyethyl)-9-(9' - carboxynonyl)-fluorene-2-sulfonic acid,
9-(2'-carboxyethyl)-9-(10' - carboxydecyl)-fluorene-2-sulfonic acid,
9,9-di-(carboxymethyl)-fluorene-2,7-disulfonic acid,
9,9-di-(2'-carboxyethyl)-fluorene-2,7-disulfonic acid,
9-(2'-carboxyethyl)-9-(3' - carboxypropyl)-fluorene-2,7-disulfonic acid,
9,9-di-(3'-carboxypropyl)-fluorene-2,7-disulfonic acid,
9-(2'-carboxyethyl)-9-(4' - carboxybutyl)-fluorene-2,7-disulfonic acid,
9,9-di-(4'-carboxybutyl)-fluorene-2,7-disulfonic acid,
9-(2' - carboxyethyl)-9-(5' - carboxypentyl)-fluorene-2,7-disulfonic acid,
9-(2'-carboxyethyl)-9-(8' - carboxyoctyl)-fluorene-2,7-disulfonic acid,
9-(2' - carboxyethyl)-9-(10' - carboxydecyl)-fluorene-2,7-disulfonic acid,
9-(2' - carboxyethyl)-9-(3'-carboxy - 2' - methylpropyl)-fluorene-2,7-disulfonic acid,
Lithium 9,9-di-(2'-carboxyethyl)-fluorene-2-sulfonate,
Lithium 9,9-di-(3'-carboxypropyl)-fluorene-2-sulfonate,
Lithium 9,9-di-(4'-carboxybutyl)-fluorene-2-sulfonate,
Lithium 9-(2'-carboxyethyl)-9-(7' - carboxyheptyl)-fluorene-2-sulfonate,
Sodium 9,9-di-(3'-carboxypropyl)-fluorene-2-sulfonate,
Sodium 9-(2'-carboxyethyl)-9-(5' - carboxypentyl)-fluorene-2-sulfonate,
Potassium 9,9-di-(2'-carboxyethyl)-fluorene-2-sulfonate,
Potassium 9-(2'-carboxyethyl)-9-(3'-carboxypropyl)-fluorene-2-sulfonate,
Potassium 9-(2'-carboxyethyl)-9-(6'-carboxyhexyl)-fluorene-2-sulfonate,
Rubidium 9,9-di-(2'-carboxyethyl)-fluorene-2-sulfonate,
Rubidium 9-(2'-carboxyethyl)-9-(5'-carboxypentyl)-fluorene-2-sulfonate,
Cesium 9,9-di-(2'-carboxyethyl)-fluorene-2-sulfonate,
Dilithium 9,9-di-(2' - carboxyethyl)-fluorene-2,7-disulfonate,
Dilithium 9-(2'-carboxyethyl)-9-(3'-carboxypropyl)-fluorene-2,7-disulfonate,
Dilithium 9-(2'-carboxyethyl)-9-(4' - carboxybutyl)-fluorene-2,7-disulfonate,
Dilithium 9-(2'-carboxyethyl)-9-(8' - carboxyoctyl)-fluorene-2,7-disulfonate,
Disodium 9,9-di-(2' - carboxyethyl)-fluorene-2,7-disulfonate,
Disodium 9-(2'-carboxyethyl)-9-(4' - carboxybutyl)-fluorene-2,7-disulfonate,
Dipotassium 9,9-di-(2'-carboxyethyl)-fluorene-2,7-disulfonate,
Dipotassium 9-(2'-carboxyethyl)-9-(5'-carboxypentyl)-fluorene-2,7-disulfonate,
Dirubidium 9,9-di-(3'-carboxypropyl)-fluorene-2,7-disulfonate,
Dicesium 9-(2'-carboxyethyl)-9-(3'-carboxypropyl)-fluorene-2,7-disulfonate,
Ammonium 9,9-di-(2'-carboxyethyl)-fluorene-2-sulfonate,
Tetramethylammonium 9,9-di-(2'-carboxyethyl)-fluorene-2-sulfonate,
Tetraphenylammonium 9,9-di-(2'-carboxyethyl)-fluorene 2-sulfonate,
Tetrabenzylammonium 9,9-di-(2'-carboxyethyl)-fluorene 2-sulfonate,
Tetratolylammonium 9,9-di-(2'-carboxyethyl)-fluorene-2-sulfonate,
Tetrahexylammonium 9,9-di-(2'-carboxyethyl)-fluorene-2-sulfonate,
Di-ammonium 9,9-di-(2'-carboxyethyl)-fluorene-2,7-disulfonate,
Di-(tetramethylammonium) 9,9-di-(2'-carboxyethyl-fluorene-2,7-disulfonate,
Di-(tetrapropylammonium) 9,9-di-(2'-carboxyethyl)-fluorene-2,7-disulfonate,
9,9-di-(2'-carbomethoxyethyl)-fluorene-2-sulfonic acid,
9-(2'-carbomethoxyethyl)-9-(7'-carbomethoxyheptyl)-fluorene-2-sulfonic acid,
9,9-di-(2'-carboethoxyethyl)-fluorene-2-sulfonic acid,
9-(2'-carboethoxyethyl)-9-(3' - carboethoxypropyl)-fluorene-2-sulfonic acid,
9-(2'-carboethoxyethyl)-9-(5' - carboethoxypentyl)-fluorene-2-sulfonic acid,
9,9-di-(2'-carbopropoxyethyl)-fluorene-2-sulfonic acid,
9-(2' - carbopropoxyethyl)-9-(4'-carbopropoxybutyl)-fluorene-2-sulfonic acid,
9-(2' - carbobutanoxyethyl)-9-(4'-carbobutanoxybutyl)-fluorene-2-sulfonic acid,
9,9-di-(4'-carbopentanoxybutyl)-fluorene-2-sulfonic acid,
9-(2'-carbopentanoxyethyl)-9-(8' - carbopentanoxyoctyl)-fluorene-2-sulfonic acid,
9-(2' - carbohexanoxyethyl)-9-(3'-carbohexanoxypropyl)-fluorene-2-sulfonic acid,
9-(2'-carboheptanoxyethyl)-9-(5'-carboheptanoxypentyl)-fluorene-2-sulfonic acid,
9,9-di-(2'-carbooctanoxyethyl)-fluorene-2-sulfonic acid,
9,9-di-(3'-carbononanoxypropyl)-fluorene-2-sulfonic acid,
9,9-di-(2'-carbodecanoxyethyl)-fluorene-2-sulfonic acid,
9-(2'-carbomethoxyethyl)-9-(4'-carbomethoxybutyl)-fluorene-2,7-disulfonic acid,
9,9-di-(3'-carboethoxypropyl)-fluorene-2,7-disulfonic acid,
9,9-di-(2'-carbopropoxyethyl)-fluorene-2,7-disulfonic acid,
9,9-di-(4-carbobutanoxybutyl)-fluorene - 2,7 - disulfonic acid,
9,9-di-(2'-carbopentanoxyethyl)-fluorene - 2,7 - disulfonic acid,
9,9-di-(2'-carbohexanoxyethyl)-fluorene - 2,7 - disulfonic acid,
9-(2' - carboheptanoxyethyl)-9-(4'-carboheptanoxybutyl)-fluorene-2,7-disulfonic acid,
9,9-di-(2'-carbooctanoxyethyl)-fluorene - 2,7 - disulfonic acid,
9,9-di-(2'-carbononanoxyethyl)-fluorene - 2,7 - disulfonic acid,
9,9-di-(2'-carbodecanoxyethyl)-fluorene - 2,7 - disulfonic acid,
Lithium 9-(2'-carbomethoxyethyl)-9-(5'-carbomethoxypentyl)-fluorene-2-sulfonate,
Sodium 9,9-di-(2' - carbomethoxyethyl)-fluorene-2-sulfonate,
Potassium 9,9-di-(3'-carbomethoxypropyl)-fluorene-2-sulfonate,
Cesium 9,9-di-(2' - carbomethoxyethyl)-fluorene-2-sulfonate,
Sodium 9,9-di-(3' - carboethoxypropyl)-fluorene-2-sulfonate,
Potassium 9-(2'-carboethoxyethyl)-9-(7'-carboethoxyheptyl)-fluorene-2-sulfonate,
Potassium 9,9-di-(2'-carboisopropoxyethyl)-fluorene-2-sulfonate,
Lithium 9,9-di-(2' - carbopropoxyethyl)-fluorene-2-sulfonate,
Sodium 9-(2'-carbobutanoxyethyl)-9-(3'-carbobutanoxypropyl)-fluorene-2-sulfonate,
Lithium 9,9-di-(2'-carbopentanoxyethyl)-fluorene-2-sulfonate,
Sodium 9-(2' - carbopentanoxyethyl)-9-(4'-carbopentanoxybutyl)-fluorene-2-sulfonate,
Sodium 9,9-di-(3'-carboheptanoxypropyl)-fluorene-2-sulfonate, Sodium 9-(2'-carbooctanoxyethyl)-9-(4'-carbooctanoxybutyl)-fluorene-2-sulfonate,
Potassium 9,9-di-(2'-carbononanoxyethyl)-fluorene-2-sulfonate,
Potassium 9,9-di-(2'-carbodecanoxyethyl)-fluorene-2-sulfonate,
Disodium 9,9-di-(2'-carbomethoxyethyl)-fluorene-2,7-disulfonate,
Disodium 9-(2'-carbomethoxyethyl)-9-(3'-carbomethoxypropyl)-fluorene-2,7-disulfonate,
Dirubidium 9,9-di-(2'-carboethoxyethyl)-fluorene-2,7-disulfonate,
Dicesium 9-(2'-carbopropoxyethyl)-9-(3'-carbopropoxypropyl)-fluorene-2,7-disulfonate,
Disodium 9-(2'-carboethoxyethyl)-9-(5'-carboethoxypentyl)-fluorene-2,7-disulfonate,
Disodium 9,9-di-(2'-carbobutanoxyethyl)-fluorene-2,7-disulfonate,
Dilithium 9-(2'-carbohexanoxyethyl)-9-(3'-carbohexanoxypropyl)-fluorene-2,7-disulfonate,
Dilithium 9-(2'-carbooctanoxyethyl)-9-(3'-carbooctanoxypropyl)-fluorene-2,7-disulfonate,
Disodium 9,9-di-(2'-carbononanoxyethyl)-fluorene-2,7-disulfonate,
Dipotassium 9,9-di-(2'-carbodecanoxyethyl)-fluorene-2,7-disulfonate,
Ammonium 9,9-di-(2'-carbomethoxyethyl)-fluorene-2-sulfonate,
Tetramethylammonium 9,9-di-(2' - carbomethoxyethyl)-fluorene-2-sulfonate,
Tetrapropylammonium 9,9-di-(2'-carbopropoxyethyl)-fluorene-2-sulfonate,
Tetraoctylammonium 9,9-di-(2'-carboheptanoxyethyl)-fluorene-2-sulfonate,
Tetraphenylammonium 9,9-di-(2'-carboethoxyethyl)-fluorene-2-sulfonate,
Tetrabenzylammonium 9,9-di-(2' - carbobutanoxyethyl)-fluorene-2-sulfonate,
Tetratolylammonium 9,9-di-(2'-carbopropoxyethyl)-fluorene-2-sulfonate,
Di-ammonium 9,9-di-(2' - carbomethoxyethyl)-fluorene-2,7-disulfonate,
Di-(tetraethylammonium) 9,9-di-(2' - carbohexanoxyethyl)-fluorene-2-sulfonate,
Di-(tetranonylammonium) 9,9-di-(2' - carbobutanoxyethyl)-fluorene-2-sulfonate,
Di-(tetraphenylammonium) 9,9-di-(2'-carboethoxyethyl)-fluorene-2-sulfonate,
Di-(tetrabenzylammonium) 9,9-di-(2'-carbomethoxyethyl)-fluorene-2-sulfonate,
Di-(tetratolylammonium) 9,9-di-(2' - carboethoxyethyl)-fluorene-2-sulfonate, and the like.

The mono-(acyloxymetallosulfo)- and di-(acyloxymetallosulfo)-9,9-di-(carboxyalkyl)-fluorene compounds of this invention can be represented by the following subgeneric formula:

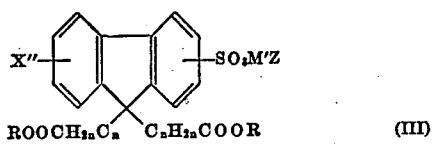

(III)

wherein X'' represents a hydrogen atom, or an —SO₃M'Z radical; M' represents a divalent metal atom, for example, beryllium, magnesium, calcium, zinc, strontium, barium, or tin; Z represents an acyloxy radical —OOCR''; R'' represents a monovalent hydrocarbyl radical, such as, an alkyl group containing from 1 to about 10 carbon atoms, for example, methyl, ethyl, propyl, isopropyl, butyl, pentyl, hexyl, 2-ethylbutyl, heptyl, octyl, 2-ethylhexyl, decyl, and the like, or an aryl radical, for example, phenyl, naphthyl, and the like, or an aralkyl radical, for example, benzyl, phenethyl, and the like, or an alkaryl radical, for example, tolyl, xylyl, and the like; R represents a hydrogen atom, or an alkyl radical containing from 1 to about 10 carbon atoms; and n is an integer having a value of from 1 to about 10, preferably from 2 to about 6.

Thus the mono-(acyloxymetallosulfo)-9,9-di-(carboxyalkyl)-fluorene compounds of this invention are represented by the formula:

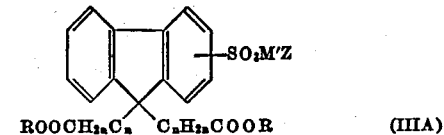

(IIIA)

and the di-(acyloxymetallosulfo)-9,9-di-(carboxyalkyl)-fluorene compounds can be represented by the formula:

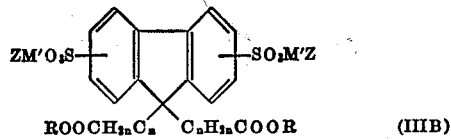

(IIIB)

The novel acyloxymetallo-9,9-di-(carboxyalkyl)-fluorene compounds falling within the scope of the Formulae (IIIA) and (IIIB) can be produced by the reaction of a diivalent metal salt of a monocarboxylic acid represented by the general formula M'(OOCR'')₂ with the free sulfonic acid compounds encompassed within the scope of sub-generic Formula II.

The acyloxymetallosulfo - 9,9 - di -(carboxyalkyl)- fluorene compounds of Formula III can be produced by heating a mixture of the fluorene sulfonic acid of Formula II and the divalent metal salt of a monocarboxylic acid. The reaction is preferably carried out using a large excess of the divalent metal acylate in the presence of a solvent. Suitable solvents are, for example, acetic acid, propionic acid, methanol, ethanol, benzene, toluene, hexane, heptane, cyclohexane, and so forth.

The divalent metal acylate is used in excess to ensure complete conversion and to prevent formation of the metal disulfonate salt. However, from about 0.5, or less, to about 10 equivalents, or more, of divalent metal acylate per equivalent of sulfonic acid radicals present in the fluorene sulfonic acid can be charged. The reaction can be carried out at any convenient temperature, and is preferably conducted at temperatures of from about 50° C. to about 150° C., most preferably at the reflux temperature of the solvent used.

In a typical reaction a hot solution of magnesium acetate in acetic acid is added to a hot solution of 9,9-di-(carboxymethyl)-fluorene-2-sulfonic acid and 2-acetoxymagnesiumsulfo-9,9-di-(carboxymethyl)-fluorene is produced. By the substitution of 9,9-di-(carboxymethyl)-fluorene-2,7-disulfonic acid, 2,7-di-(acetoxymagnesiumsulfo)-9,9-di-(carboxymethyl)-fluorene is produced.

Among the divalent metal acylates which can be used as starting materials to produce the compounds of this invention one can mention:

| | |
|---|---|
| Beryllium acetate | Zinc benzoate |
| Beryllium propionate | Zinc caproate |
| Beryllium butyrate | Zinc nonanoate |
| Beryllium octanoate | Zinc formate |
| Beryllium benzoate | Strontium acetate |
| Beryllium toluate | Strontium pentoate |
| Magnesium acetate | Strontium formate |
| Magnesium benzoate | Strontium benzoate |
| Magnesium laurate | Strontium toluate |
| Magnesium salicylate | Barium acetate |
| Calcium acetate | Barium benzoate |
| Calcium benzoate | Barium butyrate |
| Calcium butyrate | Barium decanoate |
| Calcium formate | Stannous acetate |
| Calcium isobutyrate | Stannous propionate |
| Calcium toluate | Stannous benzoate |
| Zinc acetate | Stannous 2-ethylhexanoate | et cetera.

Illustrative of the mono-(acyloxymetallosulfo)-9,9-di-(carboxyalkyl) - fluorene and di-(acyloxymetallosulfo)-9,9-di-(carboxyalkyl)-fluorene compounds contemplated by this invention one can mention:

2-hexanoyloxybariumsulfo - 9,9 - di-(3'-carboxypropyl)-fluorene,
2-propionoxycalciumsulfo-9,9-di-(2'-carboxyethyl)-fluorene,
2-propionoxyzincsulfo-9,9-di-(2'-carboxyethyl)-fluorene,
2-propionoxystannoussulfo-9,9-di-(2'-carboxyethyl)-fluorene,
2-pentanoyloxyberylliumsulfo-9-(2'-carboxyethyl)-9-(4'-carboxybutyl)-fluorene,
2-butanoyloxybariumsulfo-9-(2'-carboxyethyl)-9-(8'-carboxyoctyl)-fluorene,
2-octanoyloxycalciumsulfo 9,9-di-(carboxymethyl)-fluorene,
2-benzoyloxybariumsulfo-9,9-di-(2'-carboxyethyl)-fluorene,
2,7-di-(acetoxybariumsulfo)-9,9-di-(2'-carboxyethyl)-fluorene,
2,7-di-(acetoxystrontiumsulfo)-9-(2'-carboxyethyl)-9-(4'-carboxybutyl)-fluorene,
2,7-di-(butanoyloxycalciumsulfo)-9,9-di-(2'-carboxyethyl)-fluorene,
2,7-di-(butanoyloxyzincsulfo)-9-(2'-carboxyethyl)-9-(7'-carboxyheptyl)-fluorene,
2,7-di-(pentanoyloxystannoussulfo)-9-(2'-carboxyethyl)-9-(3'-carboxypropyl)-fluorene,
2,7-di-(hexanoyloxyberylliumsulfo)-9,9-di-(2'-carboxyethyl)-fluorene,
2,7-di-(hexanoyloxymagnesiumsulfo)-9,9-di-(4'-carboxybutyl)-fluorene,
2,7-di-(heptanoyloxybariumsulfo)-9,9-di-(2'-carboxyethyl)-fluorene,
2,7-di-(heptanoyloxystannoussulfo)-9-(2'-carboxyethyl)-9-(5'-carboxypentyl)-fluorene,
2,7-di-(octanoyloxycalciumsulfo)-9-(2'-carboxyethyl)-9-(3'-carboxypropyl)-fluorene,
2,7-di-(nonanoyloxybariumsulfo)-9,9-di-(2'-carboxyethyl)-fluorene,
2,7-di-(nonanoyloxybariumsulfo)-9,9-di-(2'-carboxyethyl)-fluorene,
2,7-di-(benzoyloxybariumsulfo)-9,9-di-(2'-carboxyethyl)-fluorene,
2,7-di-(toluyloxybariumsulfo)-9,9-di-(2'-carboxyethyl)-fluorene,
2-pentanoyloxystannoussulfo-9,9-di-(2'-carbopropoxyethyl)-fluorene,
2-butanoyloxycalciumsulfo-9,9-di-(2'-carbohexanoxyethyl)-fluorene,
2-acetoxyzincsulfo-9,9-di-(2'-carbononanoxyethyl)-fluorene,
2-heptanoyloxybariumsulfo-9-(2'-carboethoxyethyl)-9-(3'-carboethoxypropyl)-fluorene,
2-nonanoyloxystannoussulfo-9-(2'-carboethoxyethyl)-9-(3'-carbopentanoxypropyl)-fluorene,
2-butanoylbariumsulfo-9-(2'-carbomethoxyethyl)-9-(4'-carbomethoxybutyl)-fluorene,
2-octanoylstannoussulfo-9-(2'-carbopentanoxyethyl)-9-(4'-carbopentanoxybutyl)-fluorene,
2-butanoylcalciumsulfo-9-(2'-carbopropoxyethyl)-9-(6'-carbopropoxyhexyl)-fluorene,
2-acetoxyzincsulfo-9-(2'-carbomethoxyethyl)-9-(7'-carbomethoxypentyl)-fluorene,
2-acetoxycalciumsulfo-9-(2'-carbopentanoxyethyl)-9-(8'-carbopentanoxyoctyl-fluorene,
2-acetoxycalciumsulfo-9-(2'-carbomethoxyethyl)-9-(10'-carbomethoxydecyl)-fluorene,
2,7-di-(benzoyloxycalciumsulfo)-9,9-di-(2'-carboethoxyethyl)-fluorene,
2,7-di-(butanoyloxyzincsulfo)-9,9-di-(2'-carbopropoxyethyl)-fluorene,
2,7-di-(hexanoyloxystannoussulfo)-9,9-di-(2'-carbooctanoxyethyl)-fluorene,
2,7-di-(pentanoyloxymagnesiumsulfo)-9,9-di-(2'-carbopentanoxyethyl)-fluorene,
2,7-di-(acetoxyberylliumsulfo)-9-(2'-carbononanoxyethyl)-9-(3'-carbononanoxypropyl)-fluorene,
2,7-di-(octanoyloxymagnesiumsulfo)-9-(2'-carboethoxyethyl)-9-(4'-carboethoxybutyl)-fluorene,
2,7-di-(pentanoyloxymanganoussulfo)-9-(2'-carbobutanoxyethyl)-9-(4'-carbobutanoxybutyl)-fluorene,
2,7-di-(pentaoyloxystrontiumsulfo)-9-(2'-carboheptanoxyethyl)-9-(5'-carboheptanoxypentyl)-fluorene,
2,7-di-(butanoyloxycalciumsulfo)-9-(2'-carbodecanoxyethyl)-9-(5'-carbodecanoxypentyl)-fluorene,
2,7-di-(decanoyloxybariumsulfo)-9-(2'-carbomethoxyethyl)-9-(5'-carbomethoxypentyl)-fluorene,
2,7-di-(heptanoyloxyzincsulfo)-9-(2'-carbopropoxyethyl)-9-(6'-carbopropoxyhexyl)-fluorene,
2,7-di-(octanoyloxycalciumsulfo)-9-(2'-carboethoxyethyl)-9-(7'-carboethoxyheptyl)-fluorene,
2,7-di-(butanoyloxystannoussulfo)-9-(2'-carboheptanoxyethyl)-9-(8'-carboheptanoxyoctyl)-fluorene,
2,7-di-(acetoxybariumsulfo)-9-(2'-carbopropoxyethyl)-9-(9'-carbopropoxynonyl)-fluorene,
2,7-di-(propionyloxystannoussulfo)-9-(2'-carbomethoxyethyl)-9-(10'-carbomethoxydecyl)-fluorene, and the like.

The novel fluorene compounds of this invention can be used as intermediates in the production of dyestuffs, insecticides, polymers, and as plasticizers for vinyl and other resins. They find particular utility in the production of high melting crystalline linear polyesters. The polyesters produced with the compounds of this invention can be used to produce fibers which are readily dyeable with cationic and disperse dystuffs. The dyeings can be carried out by conventional procedures, even without the use of dye assistants or carriers, which have heretofore been necessary with polyesters, to produce deep, bright shades of good wash fastness and light fastness. The polyesters so produced can also be used to produce films and molded articles.

That the novel fluorene compounds of this invention could be employed as starting materials in the production of high melting, crystalline, linear polyesters was surprising and unexpected, as fluorene, the basic structure of the compounds of this invention, discolors and decomposes when heated to the temperatures employed in making linear, high molecular weight, fiber forming polyesters. Thus, it was unexpected that the compounds of this invention would be sufficiently stable, both chemically and thermally, to withstand the polycondensation conditions in the presence of the other reactants, as well as the high temperatures necessary for spinning the polyesters. It was also surprising that the fibers produced from these polyesters showed no disadvantages in physical properties over the unmodified polyester fibers, and that they exhibited greatly enhanced dyeability properties.

The following examples typically illustrate the production of the compounds of this invention. It is obvious, however, that the invention is not limited by the specific examples.

*Example 1*

There was charged to a glass reaction flask equipped with a stirrer, air condenser, thermometer, and dropping funnel, 100 grams of 9,9-di-(2'-carboxyethyl)-fluorene. Over a period of forty-five minutes, 200 grams of concentrated sulfuric acid (98 percent) was added in a dropwise manner as the temperature rose exothermically to 55° C. The mixture was stirred for two hours, and the temperature dropped to 30° C. Then the temperature was raised to 50° C. over a two-hour period by slowly heating the reaction, after which it was cooled to room temperature. The paste-like mixture was diluted with 150 milliliters of water and heated to 100° C. to solution, cooled, and the crystals recovered by filtration. The crystalline 9,9-di-(2'-carboxyethyl)-fluorene-2-sulfonic acid was dissolved in hot dilute hydrochloric acid, treated with charcoal, filtered, the filtrate cooled, and filtered again. The crystals were recrystallized a second time from concentrated hydrochloric acid and dried. There was obtained 110 grams of 9,9-di-(2'-carboxyethyl)-fluorene-2-sulfonic acid having a melting point of 217 to 220° C.

Reaction with sodium hydroxide to a pH of about 7 produces sodium 9,9-di-(2'-carboxyethyl) - fluorene - 2- sulfonate. In the same way the lithium, potassium, cesium, rubidium, and ammonium sulfonate salts are produced using the appropriate bases.

Heating a mixture of barium acetate and 9,9-di-(2'-carboxyethyl)-fluorene-2-sulfonic acid in methanol at the reflux temperature produces 2-acetoxybariumsulfo-9,9-di-(2'-carboxyethyl)-fluorene.

The use of 9-(2'-carboxyethyl)-9-(5'-carboxypentyl)-fluorene as starting material for the sulfonation reaction produces 9-(2'-carboxyethyl)-9-(5'-carboxypentyl)-fluorene-2-sulfonic acid; and 9,9-di-(3'-carboxypropyl)-fluorene-2-sulfonic acid is produced from 9,9-di-(3'-carboxypropyl)-fluorene as starting material.

Example 2

A mixture of 100 grams of 9,9-di-(2'-carboxyethyl)-fluorene-2-sulfonic acid, produced as described in Example 1, and 800 milliliters of methanol was heated at the reflux temperature for five hours. Thereafter, the solution was concentrated to 150 milliliters and a small portion removed. From this portion 9,9-di-(2'-carbomethoxyethyl)-fluorene-2-sulfonic acid is isolated by chilling and filtering. The remainder of the concentrated solution was diluted with an amount of methanol equal to that removed during the concentration. This solution was refluxed for five hours, cooled to room temperature, and the pH was adjusted to a value of 7.5 with methanolic sodium hydroxide. The solution was concentrated to about 300 milliliters, cooled, and the crystalline sodium 9,9 - di-(2'-carbomethoxyethyl)-fluorene-2 - sulfonate was filtered. The crystals were recrystallized from a solution of pyridine and methanol, and dried. The saponification equivalent calculated for sodium 9,9-di-(2'-carbomethoxyethyl)-fluorene-2-sulfonate is 220.2; the value found by analysis for the recrystallized product was 219.3. The structure of the sodium 9,9-di-(2'-carbomethoxyethyl)-fluorene-2-sulfonate product was further confirmed by infrared analysis.

In the same manner, 9,9-di-(2'-carbooctanoxyethyl)-fluorene-2-sulfonic acid is produced by reacting octanol with 9,9-di-(2'-carboxyethyl)-fluorene-2-sulfonic acid. The free sulfonic acid ester is readily converted to potassium 9,9-di-(2'-carbooctanoxyethyl)-fluorene-2-sulfonate by reaction with methanolic potassium hydroxide solution, and to tetramethylammonium 9,9-di-(2'-carbooctanoxyethyl)-fluorene-2-sulfonate by reaction with tetramethylammonium hydroxide.

Heating a mixture of calcium propionate and 9,9-di-(2'-carbomethoxyethyl)-fluorene-2-sulfonic acid in methanol at the reflux temperature produces 2-propionoxycalciumsulfo-9,9-di-(2'-carbomethoxyethyl)-fluorene.

Example 3

A 108 gram portion of concentrated sulfuric acid (98 percent) was slowly added at 0° C. to 204 grams of acetic acid with agitation. A solution of 316 grams of 9,9-di(2'-carbomethoxyethyl)-fluorene dissolved in 500 milliliters of ethylene dichloride was slowly added. The solution was stirred for four hours at 0° C. to 10° C. and gradually warmed to 45° C. over a period of three hours. Then 500 milliliters of methanol was slowly added in a dropwise manner, while permitting the ethylene dichloride-methanol azeotrope and the formed methyl acetate to distill out of the reaction. Additional methanol was added during this period and then the mixture was refluxed for eight hours, and cooled. A small portion is removed from which 9,9-di-(2'-carbomethoxyethyl)-fluorene-2-sulfonic acid is recovered. The remainder of the reaction mixture was reacted with methanolic sodium hydroxide to a pH of 7.5, and the solution was filtered. The filtrate was poured into an equal volume of hot isopropanol. On cooling, crystals of sodium 9,9 - di-(2'-carbomethoxyethyl)-fluorene - 2 - sulfonate precipitated out and were filtered and dried. The crystals started melting at 180° C. to 182° C.; the structure was confirmed by infrared analysis.

Heating a mixture of barium benzoate and 9,9-di-(2'-carbomethoxyethyl)-fluorene-2-sulfonic acid in methanol at the reflux temperature produces 2-benzoyloxybariumsulfo-9,9-di-(2'-carbomethoxyethyl)-fluorene.

Example 4

There was charged to a glass reaction flask equipped with a stirrer, condenser, and thermometer, 75 grams of 9,9-di-(2'-carboxyethyl)-fluorene and 300 grams of concentrated sulfuric acid (98 percent). The reaction mixture was heated, with stirring, on a steam bath for two and a half hours, and then allowed to stand overnight at room temperature. The solution was poured into 250 milliliters of water, treated with charcoal, filtered, the filtrate cooled, chilled in a Dry-Ice bath for two hours, and filtered again. The 9,9-di-(2'-carboxyethyl)-fluorene-2,7-disulfonic acid was recrystallized from 205 milliliters of concentrated hydrochloric acid yielding white crystals that melted at 260° C. to 262° C. A small portion of this purified disulfonic acid was again recrystallized from acetic acid, and the neutralization equivalent determined. The calculated neutralization equivalent is 117.61; the value found by analysis on this finally recrystallized sample was 117.68.

The use of 9-(2'-carboxyethyl)-9-(7'-carboxyheptyl)-fluorene as starting material for the sulfonation reaction produces 9-(2'-carboxyethyl) - 9 - (7'-carboxyheptyl)-fluorene-2,7-disulfonic acid.

Neutralization of 9,9-di-(2'-carboxyethyl)-fluorene-2,7-disulfonic acid with methanolic potassium hydroxide to a pH of about 7 produces dipotassium 9,9-di-(2'-carboxyethyl)-fluorene-2,7-disulfonate.

Heating a mixture of zinc butyrate and 9,9-di-(2'-carboxyethyl)-fluorene-2,7-disulfonic acid in benzene at the reflux temperature produces 2,7-di-(butanoyloxyzincsulfo)-9,9-di-(2'-carboxyethyl)-fluorene.

Example 5

A mixture of 46 grams of 9,9-di-(2'-carboxyethyl)-fluorene-2,7-disulfonic acid and 400 milliliters of methanol was heated at reflux for five hours, and then cooled. From a small portion of the reaction mixture 9,9-di-(2'-carbomethoxyethyl)-fluorene-2,7-disulfonic acid is recovered. The remainder of the reaction mixture was reacted with methanolic sodium hydroxide to a pH of 7.5 and a precipitate formed. The precipitate was filtered; the filtrate was concentrated on a steam bath, and on cooling a second crop of crystals was obtained and filtered. The two crystal fractions were combined and recrystallized from methanol to give the pure disodium 9,9-di-(2'-carbomethoxyethyl)-fluorene-2,7-disulfonate crystals, which were stable up ot 340° C. The disulfonate was characterized by infrared analysis and elemental analysis; calculated for $C_{21}H_{20}O_{10}SNa_2$: C, 46.49; H, 3.78; S. 11.82; found: C, 45.95; H, 3.82; S. 11.83.

In a similar manner 9,9-di-(2'-carbopentanoxyethyl)-fluorene-2,7-disulfonic acid is produced by esterifying 9,9-di-(2'-carboxyethyl)-fluorene-2,7-disulfonic acid with pentanol. From this ester the dipotassium, dilithium, dicesium, and diammonium salts are prepared by reaction with the appropriate hydroxide using the same procedure described above.

Heating a mixture of tin acetate and 9,9-di-(2'-carbomethoxyethyl)-fluorene-2,7-disulfonic acid in methanol at the reflux temperature produces 2,7-di-(acetoxytinsulfo)-9,9-di-(2'-carbomethoxyethyl)-fluorene.

Example 6

A warm solution of 448 grams of 9,9-di-(2'-carbomethoxyethyl)-fluorene-2-sulfonic acid dissolved in 1 liter of warm methanol was reacted with a methanolic potassium hydroxide solution to a pH of 7.1. On cooling, potassium 9,9-di-(2'-carbomethoxyethyl)-fluorene-2-sulfonate crystallized and was filtered. After two recrystallizations from methanol, the white crystals melted at 203° C. to 204° C.

Heating a mixture of strontium acetate and 9,9-di-(2'-carbomethoxyethyl)-fluorene-2-sulfonic acid in methanol at the reflux temperature produces 2-acetoxystrontiumsulfo-9,9-di-(2'-carbomethoxyethyl)-fluorene.

Eample 7

A methanolic solution of 9,9-di-(2'-carbomethoxyethyl)-fluorene-2-sulfonic acid was reacted with a methanolic lithium hydroxide solution to a pH of 7.1. The methanol was evaporated and the residue recrystallized from acetonitrile. After a recrystallization from methanol-acetonitrile, the solid lithium 9,9-di-(2'-carbomethoxyethyl)-fluorene-2-sulfonate melted at 281° C. to 283° C. The product was characterized by infrared analysis and elemental analysis; calculated for $C_{21}H_{21}O_7SLi \cdot H_2O$: C, 57.14; H, 5.25; found: C, 57.37; H, 5.31.

Heating a mixture of beryllium acetate and 9,9-di-(2'-carbomethoxyethyl)-fluorene-2-sulfonic acid in methanol at the reflux temperature produces 2-acetoxyberylliumsulfo-9,9-di-(2'-carbomethoxyethyl)-fluorene.

Example 8

A methanolic solution of 9,9-di-(2'-carbomethoxyethyl)-fluorene-2-sulfonic acid was reacted with a solution of ammonia dissolved in methanol to a pH of 7.1. The solution was then heated to reflux, treated with charcoal, and evaporated on a steam bath. The ammonium 9,9-di-(2'-carbomethoxyethyl)-fluorene-2-sulfonate was recrystallized three times from acetonitrile yielding a white solid that melted at 184° C. to 185° C.

Heating a mixture of magnesium acetate and 9,9-di-(2'-carbomethoxyethyl)-fluorene-2-sulfonic acid in methanol at the reflux temperature produces 2-acetoxymagnesiumsulfo-9,9-di-(2'-carbomethoxyethyl)-fluorene.

Example 9

There was charged to a glass reaction flask equipped with a reflux condenser and thermometer, 49 grams of potassium 9,9-di-(2'-carbomethoxyethyl)-fluorene-2-sulfonate, 150 milliliters of 2-methylpentanol, and 1 drop of tetraisopropyltitanate. The solution was heated at reflux for seven hours and the excess 2-methylpentanol was distilled under reduced pressure on a steam bath to leave a tacky semi-solid residue in the flask. The residue was dissolved in 200 milliliters of hot acetone, and the solution was filtered hot to remove a trace of insoluble material. After evaporation of the solvent on a steam bath, the bis-(2'-methylpentyl) ester of potassium 9,9-di-(2'-carboxyethyl)-fluorene-2-sulfonate obtained was dried at 115° C. at 2 mm. pressure to yield a white solid.

Example 10

A 14 gram portion of concentrated sulfuric acid (98 percent) was slowly added at −10 to 0° C. to 27 grams of acetic anhydride with agitation. A solution of 50 grams of 9-(2'-carbomethoxyethyl)-9-(5'-carbomethoxypentyl)-fluorene dissolved in 75 milliliters of ethylene dichloride was then added dropwise to the cold solution. The temperature of the solution was maintained at 0 to 10° C. for four hours, warming to 25° C. over a period of two hours, and then heated to 40° C. during one hour. After cooling the solution to 30° C., 150 milliliters of methanol was added in a dropwise manner and the solution was refluxed for four and a half hours. The formed methyl acetate and ethylene dichloride-methanol azeotrope were distilled from the flask and replaced with fresh methanol during the distillation. Then the methanol solution was reacted with methanolic sodium hydroxide to a pH of 7.1, and the solvent was evaporated on a steam bath to give a viscous residue. The residue was recrystallized twice from acetonitrile and dried to yield crystals of sodium 9-(2'-carbomethoxyethyl)-9-(5'-carbomethoxypentyl)-fluorene-2-sulfonate which melted at 95° C. to 100° C.

Example 11

A mixture of 96 grams of 9,9-di-(2'-carbomethoxyethyl)-fluorene-2,7-disulfonic acid was heated at reflux in 500 milliliters of methanol for eight hours, distilling most of the methanol and replacing with new methanol once. The solution was reacted with methanolic lithium hydroxide to a pH of 7.0 and the clear solution was evaporated on a steam bath to yield a clear viscous residue. After dissolving the residue in 150 milliliters of methanol, the solution was poured into 1 liter of ether and the precipitated solid, dilithium 9,9-di-(2'-carbomethoxyethyl)-fluorene-2,7-disulfonate, was filtered. The crystals were dried at 100° C. at 1 mm. pressure and did not melt at 400° C.

Example 12

There was charged to a glass reaction flask equipped with an air condenser, thermometer, and stopper, 26 grams of 9-(2'-carboxyethyl)-9-(5'-carboxypentyl)-fluorene, 100 grams of sulfuric acid and 0.2 gram of mercuric sulfate. The reaction mixture was heated at 100° C. for eight hours, cooled to room temperature, and then poured onto 60 grams of ice. No solid crystallized on standing for several days and the solution was neutralized with methanolic sodium hydroxide, precipitating sodium sulfate. After filtering off the solid sodium sulfate, the solution was evaporated on the steam bath. The residue was dissolved in 200 milliliters of methanol and heated at reflux for six hours, distilling the methanol and replacing with fresh methanol. Approximately one half of the methanol solution was reacted with methanolic sodium hydroxide to a pH of 7.0, but no solid crystallized on cooling. The methanol was evaporated on a steam bath to give a viscous residue which slowly crystallized on standing. After dissolving the residue in 150 milliliters of warm methanol and treating the solution with charcoal and filtering, the solution was added dropwise to 300 milliliters of boiling dioxane, distilling the methanol and precipitating the white crystalline disoduim 9-(2'-carbomethoxyethyl)-9-(5'-carbomethoxypentyl)-fluorene-2,7-disulfonate. After cooling the white crystals were recovered by filtration and dried.

Heating a mixture of barium acetate and 9-(2'-carbomethoxyethyl) - 9 - (5' - carbomethoxypentyl) - fluorene-2,7-disulfonic acid in methanol at the reflux temperature produces 2,7-di-(acetoxybariumsulfo) - 9 - (2'-carbomethoxyethyl)-9-(5'-carbomethoxypentyl)-fluorene.

What is claimed is:

1. A fluorene of the formula:

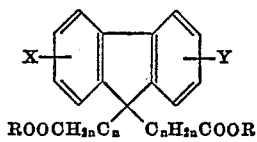

wherein X is a member selected from the group consisting of hydrogen, —SO₃H, —SO₃M, and —SO₃M'Z; Y is a member selected from the group consisting of —SO₃H, —SO₃M, and —SO₃M'Z; M is a member selected from the group consisting of lithium, sodium, potassium, rubidium, cesium, and —NR'₄; R' is a member selected from the group consisting of hydrogen, alkyl of from 1 to 10 carbon atoms, phenyl, naphthyl, benzyl, phenethyl, tolyl, and xylyl; M' is a member selected from the group consisting of beryllium, magnesium, calcium, zinc, strontium, barium, and tin; Z is acyloxy —OOCR''; R'' is a member selected from the group consisting of alkyl of from 1 to 10 carbon atoms, phenyl, naphthyl, benzyl, phenethyl, tolyl, and xylyl; R is a member selected from the group consisting of hydrogen and alkyl of from 1 to 10 carbon atoms; and $n$ is an integer having a value of 1 to 10.

2. 9,9-di-(2'-carboxyethyl)-fluorene-2-sulfonic acid.

3. 9,9 - di - (2'-carbomethoxyethyl)-fluorene-2-sulfonic acid.

4. Bis-(2-methylpentyl) ester of potassium 9,9-di-(2'-carboxyethyl)-fluorene-2-sulfonate.

5. 9,9 - di - (2' - carboxyethyl) - fluorene - 2,7 - disulfonic acid.

6. 9,9 - di - (2' - carbomethoxyethyl) - fluorene - 2,7 - disulfonic acid.

7. Sodium 9 - (2'-carbomethoxyethyl-9-(5'-carbomethoxypentyl)-fluorene-2-sulfonate.

8. Disodium 9-(2'-carbomethoxyethyl) - 9 - (5' - carbomethoxypentyl)-fluorene-2,7-disulfonate.

9. 2 - acetoxybariumsulfo - 9,9 - di - (2' - carboxyethyl)-fluorene.

10. 2,7 - di - (acetoxytinsulfo) - 9,9 - di - (2' - carbomethoxyethyl)fluorene.

References Cited in the file of this patent

UNITED STATES PATENTS 2,339,373     Bruson _____ Jan. 18, 1944

OTHER REFERENCES

Rose: J. Chem. Soc., 2360–2 (1932).
Campbell et al.: J. Chem. Soc., 2623–6 (1949).